United States Patent [19]

Tabe et al.

[11] Patent Number: 5,446,724
[45] Date of Patent: Aug. 29, 1995

[54] INFORMATION STORAGE MEDIUM WITH FIRST AND SECOND RECORDING REGIONS EACH HAVING A PREDETERMINED RECORDING DENSITY

[75] Inventors: Koichi Tabe; Kouichi Yoneyama, both of Kanagawa, Japan

[73] Assignee: Kabushiki Kaisha Toshiba, Kawasaki, Japan

[21] Appl. No.: 894,628

[22] Filed: Jun. 5, 1992

[30] Foreign Application Priority Data

Jun. 28, 1991 [JP] Japan ................... 3-158892

[51] Int. Cl.6 ............................................. G11B 7/007
[52] U.S. Cl. ..................... 369/275.1; 369/32; 369/111; 369/275.3; 369/48
[58] Field of Search .......... 369/275.1, 32, 47, 48, 369/54, 111, 275.3, 275.4; 366/48, 21, 877.06

[56] References Cited

U.S. PATENT DOCUMENTS

| | | | |
|---|---|---|---|
| 4,357,635 | 11/1982 | Hasegawa | 360/51 |
| 4,532,621 | 7/1985 | Nakagawa | 369/111 |
| 4,550,347 | 10/1985 | Nakamuta | 358/338 |
| 4,558,375 | 12/1985 | Sontheimer | 358/342 |
| 4,751,693 | 6/1988 | Yoshimaru | 369/32 |
| 4,761,772 | 8/1988 | Murakami | 369/32 |
| 4,789,979 | 12/1988 | Hiraoka et al. | 369/275.1 |
| 4,797,752 | 1/1989 | Giddings | 369/275.3 |
| 4,835,757 | 5/1989 | Abiko | 369/54 |
| 4,839,746 | 6/1989 | Kanamaru | 358/342 |
| 4,839,882 | 6/1989 | Janssen | 369/275 |
| 4,864,572 | 9/1989 | Rechen et al. | 371/2.1 |
| 4,873,679 | 10/1989 | Murai et al. | 369/32 |
| 4,896,311 | 1/1990 | Ishihara | 369/47 |
| 4,918,677 | 4/1990 | Ashinuma et al. | 369/32 |
| 4,937,804 | 6/1990 | Ishihara | 369/48 |
| 5,010,539 | 4/1991 | Terashima et al. | 369/50 |
| 5,031,168 | 7/1991 | Moore | 369/59 |
| 5,058,089 | 10/1991 | Yoshimaru et al. | 369/32 |
| 5,063,551 | 11/1991 | Yoshio et al. | 369/48 |
| 5,166,921 | 11/1992 | Matsui | 369/275.3 |
| 5,239,533 | 8/1993 | Yoshimaru et al. | 369/275.4 |
| 5,255,261 | 10/1993 | Iida et al. | 369/275.3 |
| 5,345,435 | 9/1994 | Yamasaki | 369/13 |

FOREIGN PATENT DOCUMENTS 0322418  7/1989  European Pat. Off. .
0459726 12/1991  European Pat. Off. .
59-157873 9/1984 Japan .

Primary Examiner—Scott J. Sugarman
Assistant Examiner—Kim-Kwok Chu
Attorney, Agent, or Firm—Banner & Allegretti, Ltd.

[57] ABSTRACT

A recording medium is provided for use with a device for recording data on and reading data from the recording medium using first and second recording and reading methods. A first recording region of the recording medium stores data recorded using the first method and includes blocks having a first data storage capacity. A second recording region of the recording medium stores data recorded using the second method and includes blocks having a second data storage capacity. The first and second recording regions may be, for example, first and second offset helical grooves formed on the recording medium. A device for recording and reading data on the recording medium using the first and second recording methods in accordance with identification data identifying the methods is also provided.

16 Claims, 5 Drawing Sheets

INFORMATION STORAGE MEDIUM WITH FIRST AND SECOND RECORDING REGIONS EACH HAVING A PREDETERMINED RECORDING DENSITY

BACKGROUND OF THE INVENTION

1. Field of the Invention

The present invention generally relates to a recording medium on which data is recorded and a device for recording data on and reading data from the recording medium and, more particularly, to an optical recording medium on which data is recorded and read using more than one recording and reading method and a device which uses more than one method recording data on and reading data from the recording medium method.

2. Description of the Related Art

Image filing systems are widely used as business machines for recording and reproducing document data. In these image filing systems, image data is optically read from a document and recorded onto a recording medium. The image data recorded onto the recording medium may then be read therefrom and subsequently reproduced on a display unit for visual presentation or supplied to a printer to produce a hard copy.

Optical disk devices in these image filing systems use optical disks to record and store the image data. Image data is recorded in tracks on the surface of the optical disk. An optical head of the optical disk device records data on and reads data from the optical disk. The optical head is positioned close to the optical disk and is driven by a linear motor for linear motion in the radial direction of the optical disk.

Three recording and reading methods have been developed to record and read image data on an optical disk. These methods are the constant angular velocity (CAV) method, the constant linear velocity (CLV) method, and the modified constant angular velocity (M-CAV) method. In the CAV method, the angular velocity of the optical disk is maintained at a constant value in order to stabilize the recording and reading operations and to reduce access time. In the CLV method, the angular velocity of the optical disk changes as the optical head is moved radially above the surface of the optical disk in order to maintain a constant linear velocity of the optical disk with respect to the optical head. Thus, the CAV method lends itself to the production of high density optical disks. In the M-CAV method, the angular velocity of the optical disk is set to a constant value. The frequency of a system clock is then varied in accordance with the position of the optical head such that data is recorded along the tracks of the optical disk with a predetermined constant spacing therebetween. In the M-CAV method, the frequency of the clock is increased as the optical head moves radially outwardly in order to reduce access time and increase recording capacity.

Recently, optical disk devices have been developed which can record data on and read data from an optical disk using different recording and reading methods. For example, Japanese Patent Disclosure (Kokai) No. 59-157873 discloses an optical disk device which uses both the CAV method and the CLV method. U.S. Pat. No. 4,896,311, incorporated herein by reference, discloses an optical disk device which uses both the CAV method and the M-CAV method. In these optical disk devices, an operator can select the recording and reading method as desired.

However, conventional optical disks have data recorded on and read therefrom using only one recording and reading method. Thus, it is necessary to change the optical disk each time an operator selects and changes the method for recording and reading dam.

Optical disk devices used in the image filing systems record image data on the optical disk. Recently, optical disk devices have been developed which can record code data when the optical disk device is used as a recording device for a personal computer or a word processor. However, the memory capacity of the optical disks differ from each other with respect to the recording of image data and the recording of code data. However, the recording area of conventional optical disks is divided into a plurality of blocks having equal data storage capacities of, for example, 256 bytes, 512 bytes, 1024 bytes or 2048 bytes. Therefore, it is necessary to change the optical disk used for each purpose.

SUMMARY OF THE INVENTION

Accordingly, it is an object of the present invention to provide a recording medium on which data can be recorded and read using more than one recording and reading method.

It is a further object of the present invention to provide a recording medium for use with a recording device including means for recording and reading data on the medium using a first recording method and means for recording a reading data on the medium using a second recording method.

It is still a further object of the present invention to provide a recording medium including blocks having different data storage capacities.

It is still a further object of the present invention to provide a device for recording data on and reading data from a recording medium.

In accordance with the present invention, an information recording medium including a mechanism for recording and reading data on the recording medium using a first method and a mechanism for recording and reading data on the recording medium using a second method is provided. The recording medium includes a first recording region for storing data recorded using the first method and comprising concentric circular or helical tracks each having a plurality of blocks, each block of the first tracks having a first data storage capacity and each of the first tracks having a same number of blocks. The recording medium also includes a second recording region for storing data recorded using the second recording method and comprising concentric circular or helical second tracks each having a plurality of blocks, each block of the second tracks having a second data storage capacity different than the first data storage capacity. One of the second tracks has a first number of blocks and another of the second tracks has a second number of blocks.

In accordance with another aspect of the present invention, an information recording medium for use with a recording device is provided. The recording device includes a mechanism for recording and reading data on the medium using a first method and a mechanism for recording and reading data on the medium using a second method. The medium includes a first recording region for storing data recorded using the first method, the first recording region including a first helical groove formed to extend from an inner to an outer portion of the recording medium. A second recording region of the recording medium stores data recorded using the second method, the second recording region including a second helical groove offset from the first helical groove and extending from the inner to the outer portion of the recording medium.

In accordance with another aspect of the present invention, an information recording medium for recording information includes a first recording region having a plurality of blocks each having a first data storage capacity for storing information and a second recording region having a plurality of blocks each having a second data storage capacity different than the first data storage capacity for storing information.

In accordance with yet another aspect of the present invention, a device for recording data on and reading data from an information recording medium having first and second recording regions is provided. The device includes a recording and reading mechanism for recording and reading data on the first recording region using a first method and on the second recording region using a second method. A detector detects identification data identifying the method used to record and read data on the first and second recording regions. A control section controls the recording and reading mechanism to record and read data using one of the first and second methods in accordance with the detected identification data.

BRIEF DESCRIPTION OF THE DRAWINGS

A more complete appreciation of the present invention and many of the attendant advantages thereof will be readily obtained as the invention becomes better understood by reference to the following detailed description, when considered in connection with the accompanying drawings, wherein.

DETAILED DESCRIPTION OF THE PREFERRED EMBODIMENTS

Figure 1:
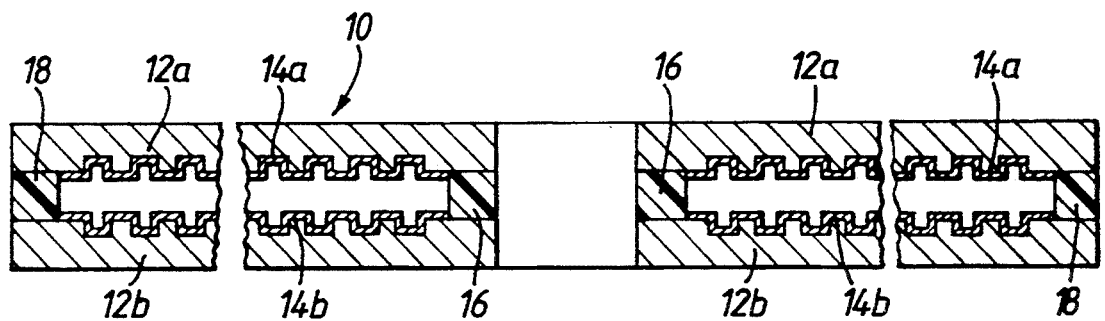
FIG. 1 is a side view of a recording medium according to the present invention.
Figure 2:
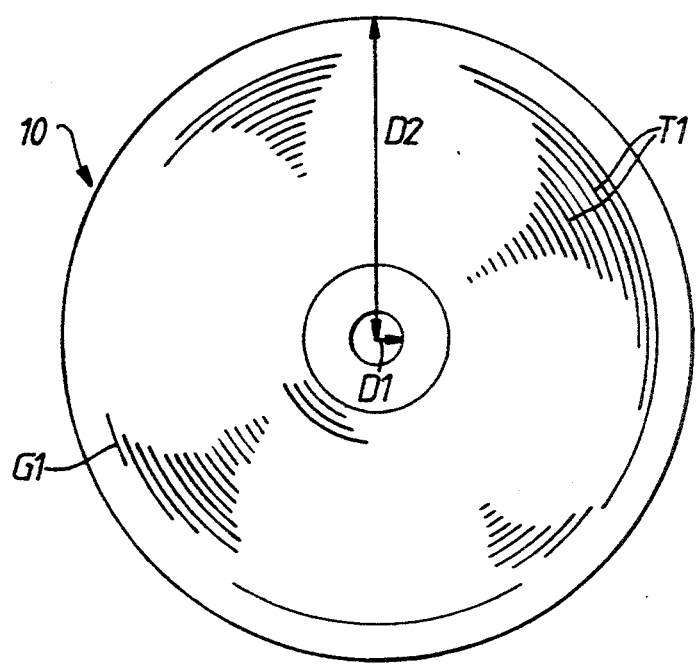
FIG. 2 is a plan view of the recording medium shown in FIG. 1.

FIGS. 1 and 2 show a recording medium according to the present invention. For illustrative purposes, the recording medium depicted is an optical recording medium. However, it will be apparent that other recording media may be utilized and the invention is not limited in this respect.

The construction of an optical disk 10 will be described with reference to FIG. 1. Optical disk 10 includes disk shaped substrates 12a and 12b, each substrate having an inner diameter D1 of about 15 millimeters (mm), an outer diameter D2 of about 130 millimeters (mm) and a thickness of about 1.2 millimeters (mm). Substrates 12a and 12b may be formed from glass or an optically transparent plastic material, such as acrylic resin, polycarbonate, and the like and are attached via an inner spacer 16 and an outer spacer 18. Recording layers 14a and 14b are deposited on inner surface portions of substrates 12a and 12b, respectively. Recording layers 14a and 14b preferably include tellurium and data is recorded on these layers by the formation of pits.

As shown in FIG. 2, optical disk 10 includes a helical groove G1. Groove G1 is formed on a recording area of optical disk 10 and extends from an inner portion of the disk to an outer portion thereof. Alternatively, a plurality of concentric grooves may be arranged on the recording area of optical disk 10. Groove G1 has a width of 0.6 micrometers ($\mu$m), a pitch of 1.6 micrometers ($\mu$m) and a depth of $n\lambda/8$, where n is the index of refraction of the substrate and $\lambda$ is the wavelength of a laser beam projected onto the optical disk. Groove G1 is segmented into a plurality of, for example, 19,000 tracks T1, each track T1 corresponding to one turn of helical groove G1 on optical disk 10. Tracks T1 are numbered consecutively from 0 to 18,999.

Figure 3:
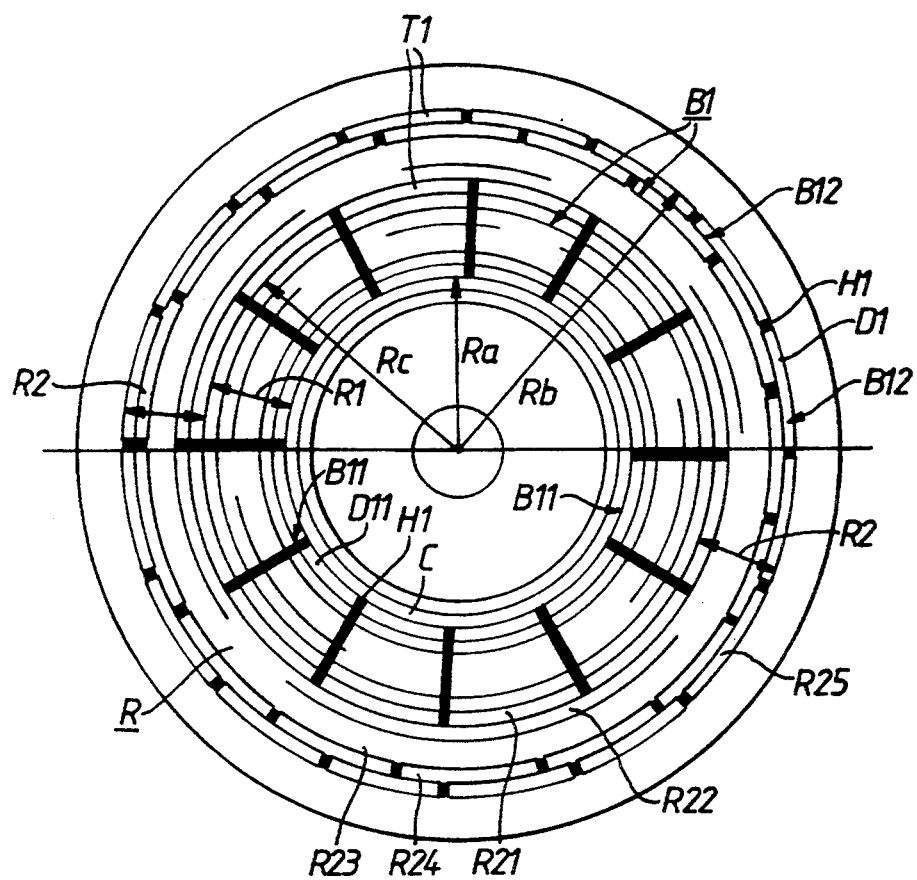
FIG. 3 is a plan view illustrating a block pattern on the recording medium shown in FIGS. 1 and 2.

In accordance with a first embodiment shown in FIG. 3, optical disk 10 has an annular recording region R which is defined by first radius Ra (where Ra equals, for example, 25.00 millimeters (mm)) and by a second radius Rb (where Rb equals, for example, 61.00 millimeters (mm)). Recording region R includes a first recording region R1 and a second recording region R2. First recording region R1 is defined by radius Ra and a radius Rc (where Rc equals, for example, 43.00 millimeters (mm)). Second recording region R2 is defined by radius Rc and radius Rb.

Data is preferably recorded on and read from first recording region R1 using the CAV method and recorded on and read from second recording region R2 using the CLV or the M-CAV method. Thus, the spacing between adjacent recording pits increases with increasing radial position from the center of optical disk 10 in first recording region R1 and the spacing between adjacent recording pits is substantially constant in second recording region R2.

Optical disk 10 also has a control track region C positioned radially inward of first recording region R1. Information recorded in control track region C includes identification data to identify the types of optical disks by, for example, the recording and reading method and the data storage capacity of a block (as discussed below), the characteristic of recording layers 12a and 12b, and the like. An optical disk device for recording data on and reading data from an optical disk may verify the type of optical disk by reading identification data recorded in control track region C.

As shown in FIG. 3, tracks T1 are segmented into a plurality of blocks B1. Each block B1 defines a unit for recording and reading data. Blocks B1 include a plurality of first blocks B11 formed on first recording region R1 and a plurality of second blocks B12 formed on second recording region R2. Each first block B11 has a first data storage capacity of, for example, 1024 bytes. Each second block B12 has a second data storage capacity of, for example, 2048 bytes. The lengths of blocks B11 increase with increasing radial position from the center of optical disk 10. The lengths of blocks B2 formed on second recording region R2 are substantially equal to each other. Thus, the number of blocks B12 increases with increasing radial position from the center of optical disk 10. As shown in Table 1, in the present embodiment, first recording region R1 has 9400 tracks and 12 blocks per track. Second recording region R2 has 9400 tracks and from 12 to 16 blocks per track.

TABLE 1

| RECORDING REGION | NUMBER OF TRACKS | BLOCKS PER TRACK | RECORDING METHOD |
| --- | --- | --- | --- |
| First Recording Region (R1) | 9400 | 12 | CAV |
| Second Recording Region (R2) | 9400 | FROM 12 to 16 | CLV or M-CAV |

Second recording region R2 includes first, second, third, fourth and fifth recording portions R21, R22, R23, R24 and R25, respectively. As shown in Table 2, first recording portion R21 has 1880 tracks with 12 blocks per track. Second recording portion R22 has 1880 tracks with 13 blocks per track. Third recording portion R23 has 1880 tracks with 14 blocks per track. Fourth recording portion R24 has 1880 tracks and 15 blocks per track. Fifth recording portion R25 has 1880 tracks with 16 blocks per track. Thus, the number of blocks per track provided in recording groups R21, R22, R23, R24 and R25 increases with increasing radial position from the center of optical disk 10.

TABLE 2

| RECORDING REGION | RECORDING PORTION | NUMBER OF TRACKS | BLOCKS PER TRACK |
| --- | --- | --- | --- |
| SECOND RECORDING REGION (R2) | R21 | 1880 | 12 |
| | R22 | 1880 | 13 |
| | R23 | 1880 | 14 |
| | R24 | 1880 | 15 |
| | R25 | 1880 | 16 |

If data is recorded and read in second recording region R2 using the CLV method, the angular velocity of optical disk 10 is changed in accordance with recording portions R21 to R25. If data is recorded and read in second recording region R2 using the M-CAV method, optical disk 10 is rotated at a constant angular velocity and the frequency of a system clock (i.e., recording timing) is varied in accordance with recording portions R21 to R25.

Figure 4:
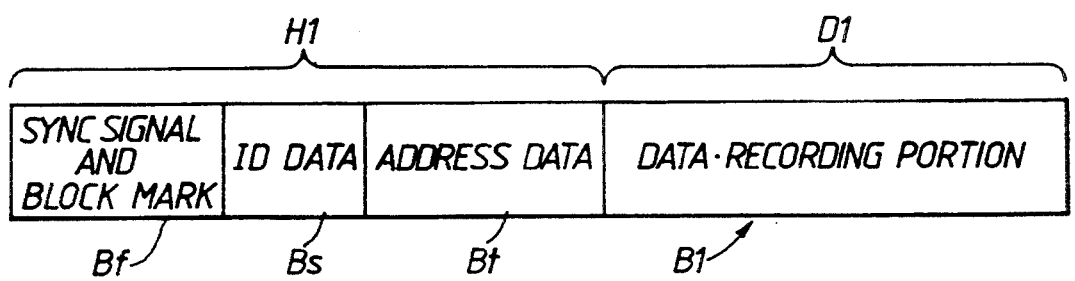
FIG. 4 is a diagram illustrating a block header format of a block on the recording medium shown in FIG. 3.

As shown in FIGS. 3 and 4, each block B1 includes a block header H1 and a data recording portion D1. Data recording portion D1 is used for recording data supplied from an output device, such as an image reading apparatus or a personal computer. Block header H1 includes a first header portion Bf for recording a synchronizing signal and a block mark indicating the starting point of block B1, a second header portion Bs for recording identification data identifying the recording and reading method and the data storage capacity of block B1, and a third header portion Bt for recording address data, such as a track number, a block number, and the like. Second recording portion Bs may include, for example, "01" to indicate the CAV recording and reading method, "02" to indicate the CLV recording and reading method, and "03" to indicate the M-CAV recording and reading method. Thus, the optical disk device for recording and reading data may verify the recording and reading method for each block B1 of optical disk 10. In first recording region R1, a spacing between adjacent block headers H increases with increasing radial position from the center of optical disk 10. In second recording region R2, a spacing between adjacent block headers H is substantially constant.

Figure 5:
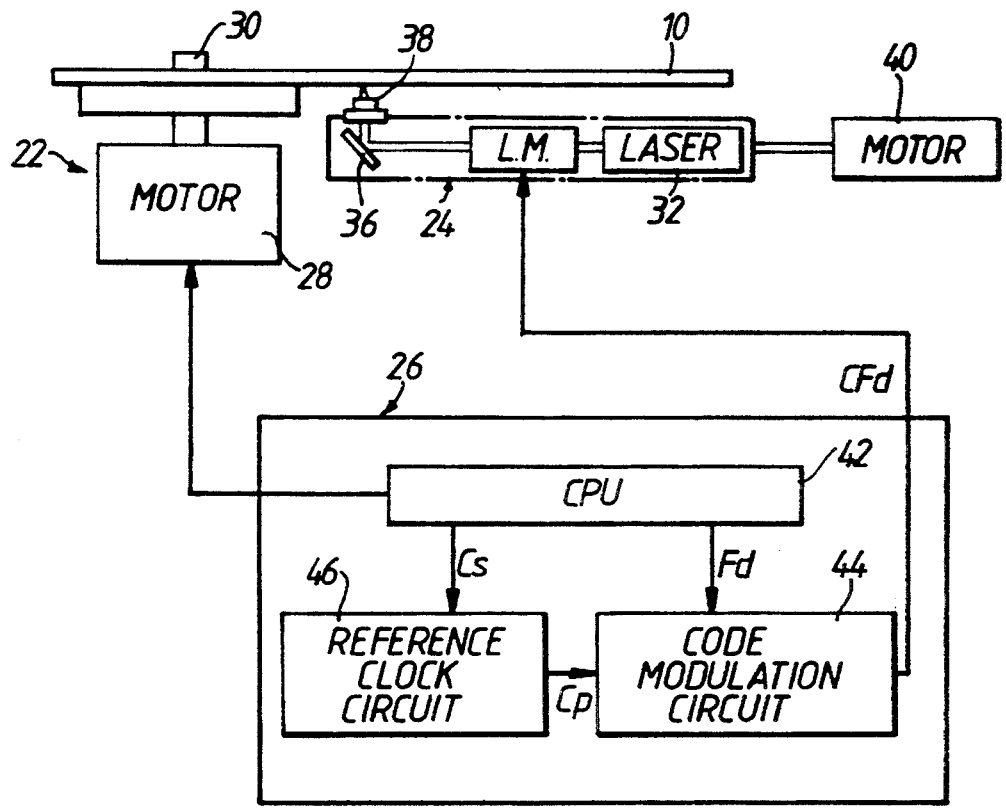
FIG. 5 is a block diagram of a recording apparatus for recording the block headers shown in FIG. 3.

The recording method of block header H1 of optical disk 10 will now be described with reference to FIG. 5. As shown in FIG. 5, a recording device 20 for recording block header H1 on optical disk 10 includes a motor unit 22, a laser unit 24 and a control unit 26. Motor unit 22 includes a motor 28 for rotating optical disk 10 and a shaft 30 to which optical disk 10 is coupled. Laser unit 24 faces optical disk 10 and includes a semiconductor laser 32, a laser modulator 34, a mirror 36 and an objective lens 38. Laser unit 24 is driven by a motor 40 for motion in the radial direction of optical disk 10. Laser modulator 34 modulates a laser beam generated by semiconductor laser 32 in accordance with data supplied from control unit 26. Control unit 26 includes a central processing unit (CPU) 42, a code modulation circuit 44 and a reference clock circuit 46. Code modulation circuit 44 is connected to laser modulator 34 and CPU 42 is connected to motor 28.

Format data Fd (the synchronizing signal, the block mark, the identification data and the address data) of block header H1 is recorded on recording region R of optical disk 10 by laser unit 24 when optical disk 10 is rotated at a constant angular velocity by motor 22 and objective lens 38 of laser unit 24 faces recording region R of optical disk 10. Specifically, CPU 42 supplies format data Fd to code modulation circuit 44. Code modulation circuit 44 also receives a clock pulse signal Cp from reference clock circuit 46. Code modulation circuit 44 converts format data Fd into coded format data CFd and supplies this coded format data Cfd to laser modulator 34 in response to clock pulse signal Cp.

Laser modulator 34 modulates the laser beam generated by semiconductor laser 32 in accordance with coded format data Cfd received from code modulation circuit 44. The modulated laser beam is focused on optical disk 10 by objective lens 38, such that coded format data Cfd is recorded in the form of pits on recording region R of optical disk 10. The synchronizing signal is recorded on first recording portion Bf, the identification data is recorded in second recording portion Bs and the address data is recorded on third recording portion Bt.

CPU 42 includes counters for counting the number of tracks T1 and the number of blocks B1 of optical disk 10. For example, the track number is increased by one for each rotation of optical disk 10. The block number is increased by one each time format data Fd is recorded on optical disk 10. CPU 42 generates a track number and a block number in accordance with the counters and supplies this information to code modulation circuit 44. CPU 42 generates a control signal Cs in accordance with the track number and supplies this signal to reference clock circuit 46. Reference clock circuit 46 changes the frequency of clock pulse signal Cp in accordance with control signal Cs from CPU 42. Reference clock circuit 46 includes a programmable synthesizer (not shown) which divides the frequency of clock pulse signal Cp in accordance with control signal Cs to generate clock pulse signal Cp of a predetermined frequency. For example, the frequency of clock pulse signal Cp is constant while block headers H1 are recorded on first recording region R1. The frequency of clock pulse signal Cp increases as block headers H1 are recorded on first recording portion R21 to fifth recording portion R25 of second recording region R2. Accordingly, block headers H1 are recorded on optical disk 10 having a first recording region R1 and a second recording region R2 as shown in FIG. 3.

Figure 6:
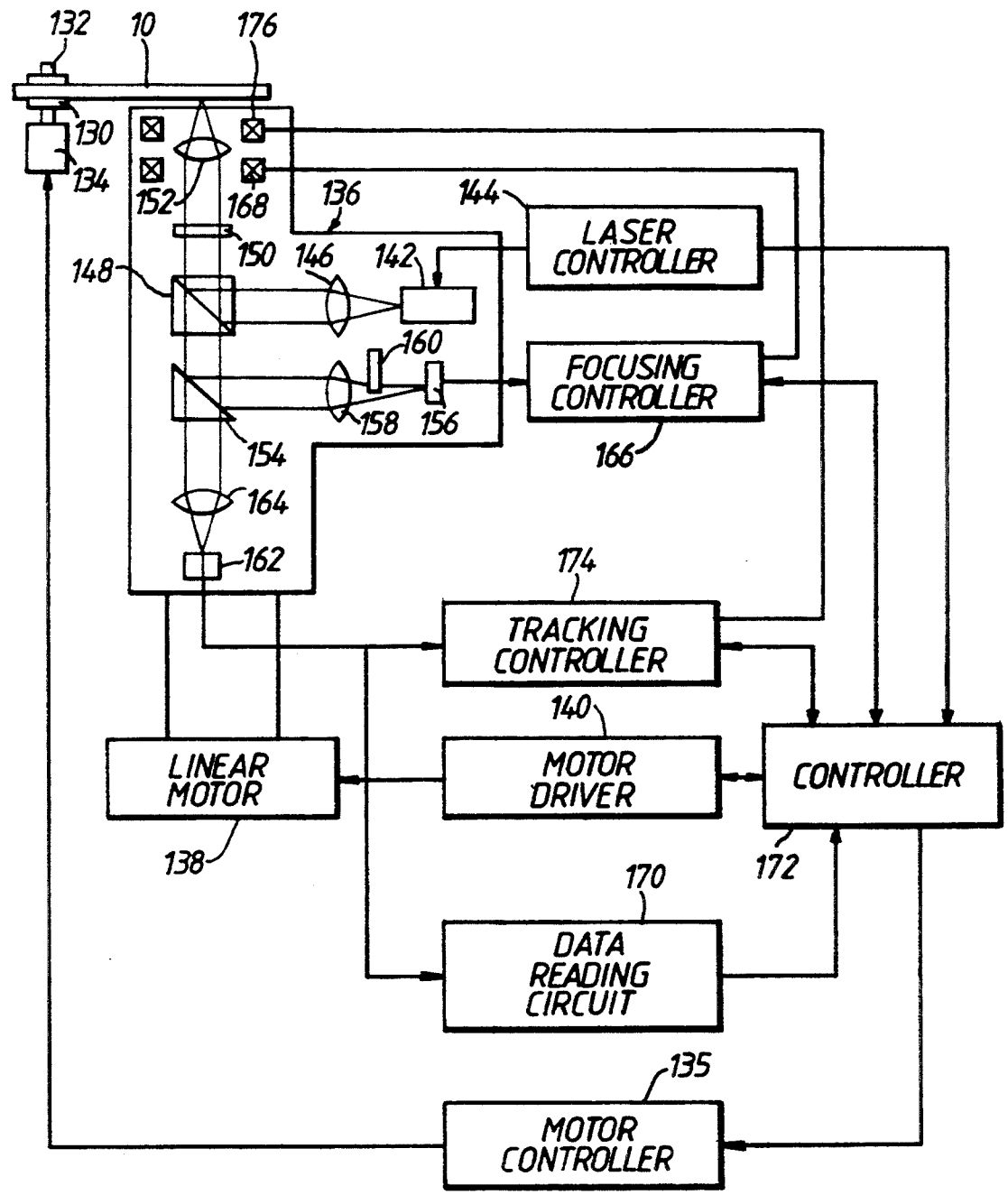
FIG. 6 is a schematic block diagram of an optical disk device for recording data on and reading data from the recording medium shown in FIG. 1.

Referring to FIG. 6, the details of an optical disk device 100 for recording data on and reading from optical disk 10 having first and second recording regions R1 and R2 will be described. Optical disk device 100 can record and read data, for example, using both the CAV method and the CLV method. Optical disk 10 is placed on a turn table 130 which is coupled to a shaft 132 of a motor 134 for rotating optical disk 10. An optical head 136 is positioned close to a surface of optical disk 10. Motor 134 is driven by motor controller 135 such that optical disk 10 is rotated at a constant angular speed or a constant linear speed with respect to optical head 136 in accordance with the recording and reading method. Optical head 136 is mounted to a carrier (not shown) of a linear motor 138 for moving optical head 136. Linear motor 138 is coupled to a motor driver 140 for moving optical head 136 in a radial direction over the surface of optical disk 10.

Optical head 136 includes a semiconductor laser 142 for generating a light beam. Semiconductor laser 142 is coupled to a laser controller 144 for driving semiconductor laser 142 and controlling the output intensity of the light beam to record data on and read data from optical disk 10. A collimating lens 146 collimates the light beam generated by semiconductor laser 142. The collimated light beam is guided to an objective lens 152 through a polarizing beam splitter 148 and a quarterwave plate 150. The collimated light beam is then focused on the surface of optical disk 10 by objective lens 152.

Objective lens 152 causes the light beam reflected from the surface of optical disk 10 to be parallel to the light beam generated by semiconductor laser 142. The parallel light beam is guided to a half prism 154 through quarterwave plate 150 and polarizing beam splitter 148. Half prism 154 divides the light beam into two components. One component is directed to a first photosensor 156 through a first condenser lens 158 and a knife edge 160. The other component is directed to a second photosensor 162 through a second condenser lens 164.

Photosensor 156 is coupled to a focusing controller 166. Focusing controller 166 generates a focusing error signal based on the light beam detected by photosensor 156 and supplies the focusing error signal to a first lens actuator 168. First lens actuator 168 moves objective lens 152 along its optical axis (up and down in FIG. 6) in response to the focusing error signal to perform the focusing control operation.

Photosensor 162 is coupled to a tracking controller 174. As discussed below, tracking controller 174 generates a tracking error signal based on the light beam detected by photosensor 162. Tracking controller 174 then supplies a driving signal corresponding to the tracking error signal to a second lens actuator 176. Second lens actuator 176 moves objective lens 152 in a direction perpendicular to the optical axis of objective lens 152 (side to side in FIG. 6) in response to the driving signal. Thereby, the light beam focused by objective lens 152 may be set on track T of optical disk 10. Thereby, the tracking control operation is performed.

Photosensor 162 is coupled to a data reading circuit 170 for reading data recorded on optical disk 10. Data reading circuit 170 reads data recorded on optical disk 10 corresponding to the light beam detected by photosensor 162 and supplies the data to a controller 172. Data reading circuit 170 includes a signal processing circuit (not shown) and a header separate circuit (not shown). The signal processing circuit performs an amplification of the signal supplied from photosensor 162 and a binary conversion of the amplified signal. The header separate circuit separates data recorded on block header H1 and data recorded on data recording area D1 from the binary signal received from the signal processing circuit and supplies the separate data to controller 172. Thereby, recording data recorded on data recording area D1 and address data and identification data recorded on block header H1 may be read. Thus, controller 172 may confirm the recording and reading method and the data storage capacity of block B1 by the read identification data. Also, data reading circuit 170 reads the identification data recorded on control track region C of optical disk 10. Thereby, controller 172 can identify the type of optical disk 10 supported on turntable 130.

Controller 172 controls motor controller 135, motor driver 140, laser controller 144, focus controller 166, data reading circuit 170 and tracking controller 174, and executes a predetermined operation, for example, the data recording operation and the data reading operation. Controller 172 identifies the type of data to be recorded, for example, image data or code data.

The operation of optical disc device 100, the data reading operation and the data recording operation, will be described with reference FIG. 6.

When the data recording operation and the data reading operation are performed, optical disk 10 is rotated by motor 134 at a predetermined speed and optical head 136 is moved to control track region C of optical disk 10 by linear motor 138. Optical head 136 focuses the light beam on control track region C and data reading circuit 170 reads the identification data recorded on control track region C. Thereby, controller 172 identifies the type of optical disk 10, the recording and reading methods of first and second recording regions R1 and R2, and the data storage capacity of block B1 of first recording region R1 and second recording region R2. Controller 172 controls motor controller 135 and motor driver 140 in accordance with the type of optical disk 10. For example, controller 172 controls motor controller 135 so as to rotate optical disk 10 at the constant angular speed or the constant linear speed with respect to optical head 136. Also, controller 172 controls motor driver 140 so as to access optical head 136 at a predetermined position of optical disk 10 in accordance with type of data to be recorded.

In the data recording operation, controller 172 determines the data recording position in accordance with type of data or selected recording and reading method and optical head is moved to a predetermined position of optical disk 10. Controller 172 supplies a control signal to motor controller 135 such that optical disk 10 is rotated by motor at a predetermined rotating speed. In the present embodiment, the angular velocity of optical disk 10 is maintained at a constant value when data is recorded on first recording region R1 of optical disk 10 and the angular velocity of optical disk 10 is changed in accordance with recording portion R21 to R25 of second recording region R2 when data is recorded on second recording region R2. Controller 172 then supplies a recording signal which is modulated in accordance with the data to be recorded to laser controller 144. Laser controller 44 supplies a current corresponding to the recording signal to semiconductor laser 142. Semiconductor laser 142 generates a recording light beam frequency-modulated in accordance with the recording signal. The recording light beam generated by semiconductor laser 142 is focused on track T of optical disk 10 by objective lens 152, such that recording pits are formed on optical disk 10.

In the data reading operation, optical disk 10 is rotated by motor 134 and optical head 136 is moved to a predetermined position of optical disk 10 by linear motor 138 in accordance with data to be read. Controller 172 supplies a control signal to motor controller 135 such that optical disk 10 is rotated by motor 134 at a predetermined rotating speed. In the present embodiment, the angular velocity of optical disk 10 is maintained at a constant value when data is read from first recording region R1 of optical disk 10 and the angular velocity of optical disk 10 is changed in accordance with recording portion R21 to R25 of second recording region R2 when data is read from second recording region R2. Controller 172 then supplies a control signal for reading data to laser controller 144. Semiconductor laser 142 generates a reading light beam in response to the control signal. The reading light beam generated by semiconductor laser 142 is focused on track T of optical disk 10 by objective lens 152. The light beam reflected from optical disk 10 detected by second photosensor 162. Second photosensor 162 generates a reading signal corresponding to the intensity of the detected light beam detected and supplies the reading signal to data reading circuit 170. Thereby, data recorded on optical disk 10 can be read.

In the data reading operation, also, identification data recorded on block header H1 of block B1 may be read. Thus, controller 172 may confirm the recording and reading method and the data storage capacity of block B1 by the identification data when data is recorded on and read from optical disk 10.

As described above, in the present invention, data may be recorded on and read from optical disk 10 having first recording region R1 and second recording region R2, each recording region having data recorded using a different recording method. Thus, when optical disk 10 is used in optical disk device 100, there is no need to change optical disk 10 each time the recording and the reading method is changed. Therefore, data can be recorded on and read from optical disk 10 more efficiently by optical disk device 100.

Figure 7A:
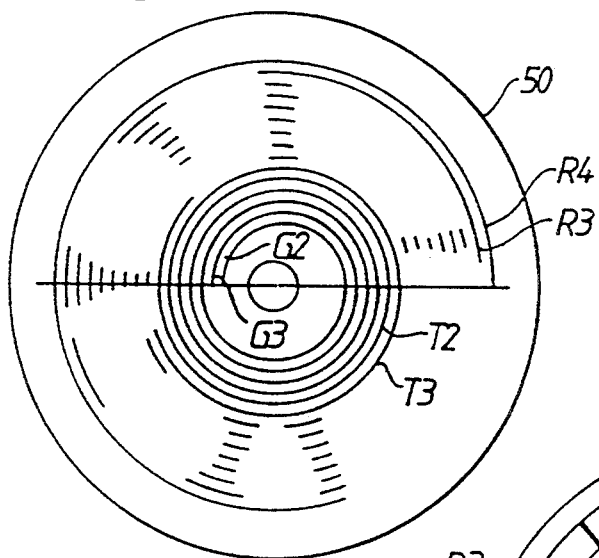
FIGS. 7(a) and 7(b) are views illustrating another block pattern formed on the recording medium shown in FIGS. 1 and 2.

FIG. 7 illustrates a second embodiment of the present invention. Optical disk 50 includes a first recording region R3 defined by a first helical groove G2 and a second recording region R4 defined by a second helical groove G3 offset from first helical groove 62 as shown in FIG. 7(a). First and second helical grooves G2 and G3 extend from the inner to the outer portion of optical disk 50. First and second grooves G2 and G3 each have a width of 0.6 micrometers (μm) and a pitch of 3.2 micrometers (μm). The pitch between first groove G2 and second groove G3 is 1.6 micrometers (μm). The depth of first groove G2 is nλ/8 and the depth of second groove G3 is nλ/4. First helical groove G2 is segmented into a plurality of, for example, 9400 first tracks T2. Each first track T2 corresponds to one turn of first helical groove G2 on optical disk 50. Second helical groove G3 is segmented into a plurality of, for example, 9400 second tracks T3. Each second track T3 corresponds to one turn of second helical groove G3 on optical disk 50. Data is preferably recorded on and read from first helical track T2 of first recording region R3 using the CAV method. Data is preferably recorded on and read from second helical track T3 of second recording region R4 using the CLV method or the M-CAV method. Thus, in first recording region R3, the spacing between adjacent recording pits increases with increasing radial position from the center of optical disk 50. In second recording region R4, the spacing between adjacent recording pits is substantially constant.

Figure 7B:
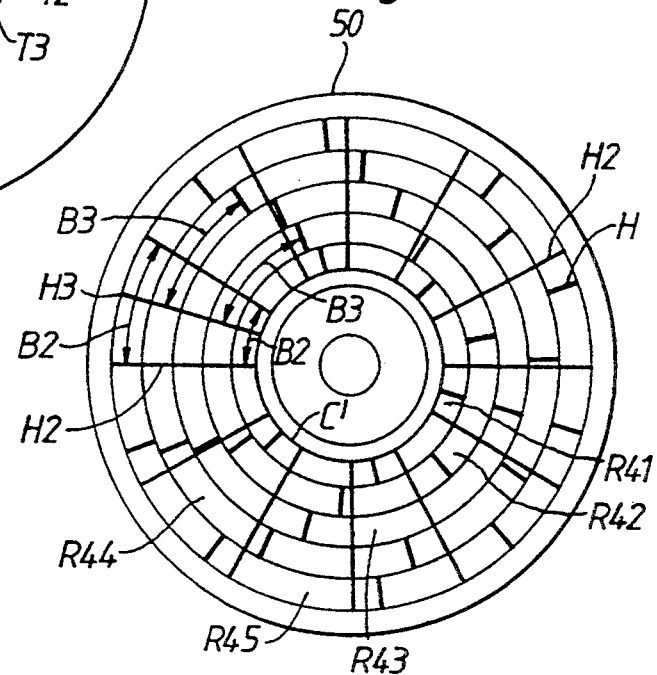

As shown in FIG. 7(b), first and second tracks T2 and T3 are respectively segmented into a plurality of blocks B2 and B3 which are formed from the inner to the outer periphery of optical disk 50. For ease of illustration, tracks T2 and T3 illustrated as concentric tracks. Each of first blocks B2 formed on first tracks T2 has a predetermined data storage capacity of, for example, 1024 bytes. Each of second blocks B3 formed on second tracks T3 has a predetermined data storage capacity of, for example, 2048 bytes. The lengths of blocks B2 formed on first recording region R3 increase with increasing radial position from the center of optical disk 50. The lengths of second blocks B3 formed on second recording region R4 are substantially equal to each other. Thus, the number of second blocks B3 increases with increasing radial position. As shown in Table 3, first recording region R3 has 9400 tracks with 12 blocks per track. Second recording region R4 has 9400 tracks with from 6 to 10 blocks per track.

TABLE 3

| RECORDING REGION | NUMBER OF TRACKS | BLOCKS PER TRACK | RECORDING METHOD |
|---|---|---|---|
| First Recording Region (R3) | 9400 | 12 | CAV |
| Second Recording Region (R4) | 9400 | FROM 6 to 10 | CLV or M-CAV |

Second recording region R4 includes first, second, third, fourth and fifth recording portions R41, R42, R43, R44 and R45. As shown in Table 4, first recording portion R41 has 1880 tracks and 6 blocks per track. Second recording portion R42 has 1880 tracks and 7 blocks per track. Third recording portion R43 has 1880 tracks and 8 blocks per track. Fourth recording portion R44 has 1880 tracks and 9 blocks per track. Fifth recording portion R45 has 1880 tracks and 10 blocks per track. Thus, the number of blocks per track increases with increasing radial position from the center of optical disk 50.

TABLE 4

| RECORDING REGION | RECORDING PORTION | NUMBER OF TRACKS | BLOCKS PER TRACK |
|---|---|---|---|
| SECOND RECORDING REGION (R4) | R41 | 1880 | 6 |
| | R42 | 1880 | 7 |
| | R43 | 1880 | 8 |
| | R44 | 1880 | 9 |
| | R45 | 1880 | 10 |

If data is recorded and read in second recording region R4 using the CLV method, the angular velocity of optical disk 50 is changed for each recording portion R41 to R45. If data is recorded and read in second recording region R4 using the M-CAV method, optical disk 10 is rotated at a constant angular velocity and the frequency of a system clock (i.e., the recording timing) is varied in accordance with each recording portion R41 to R45.

As shown in FIG. 7(b), each first block B2 has a block header H2 and a data recording portion D2. Each second block B3 has a block header H3 and a data recording portion D3. Block headers H2 and H3 are positioned in the header position of each block and include first, second, and third header portions Bf, Bs and Bt similar to the block header portion of block header H1 shown in FIG. 5.

Figure 8A:
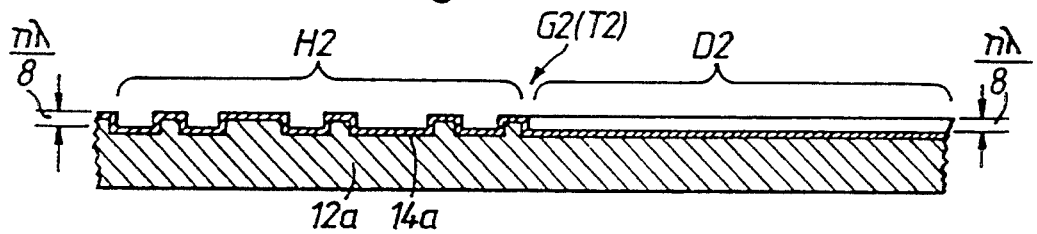
FIGS. 8(a) and 8(b) are enlarged cross-sectional views illustrating the structure of the block headers of the recording medium of FIG. 6.
Figure 8B:
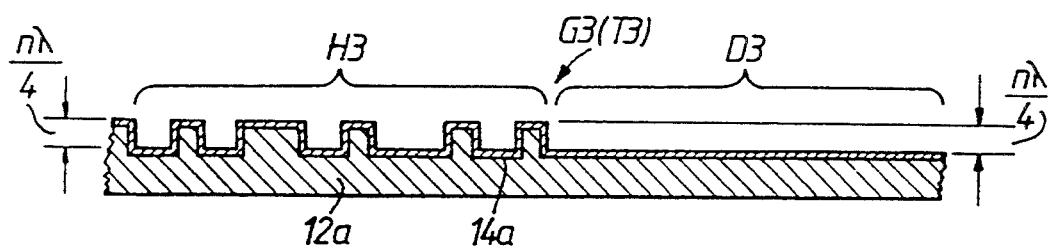

As shown in FIG. 8, block headers H2 and H3 are formed as repetitive grooves in the form of pits. As shown in FIG. 8(a), for example, the depth of a pit of block header H1 is $n\lambda/8$. As shown in FIG. 8(b), the depth of a pit of block header H2 is $n\lambda/4$. Data of block headers H2 and H3 are read out as changes in the amount of reflected light diffracted in accordance with the presence and absence of the groove. The depth of first helical groove G2 is different than the depth of second helical groove G3. Thus, it is easy to perform the tracking control operation.

Optical disk 50 also includes a control track region C' for recording identification data to identify the type of optical disk 50. Control track region C' is positioned on a radially inward portion of optical disk 50 and includes 200 tracks.

Thus, data may be recorded on and read from an optical disk 50 having first recording region R3 and second recording region R4, each recording region having data recorded thereon using different methods. Thus, when optical disk 50 is used in optical disk device 100 as shown in FIG. 6, there is no need to change optical disk 50 each time the recording and reading method is changed. Therefore, data can be recorded on and read from optical disk 50 more efficiently by optical disk device 100.

Figure 9:
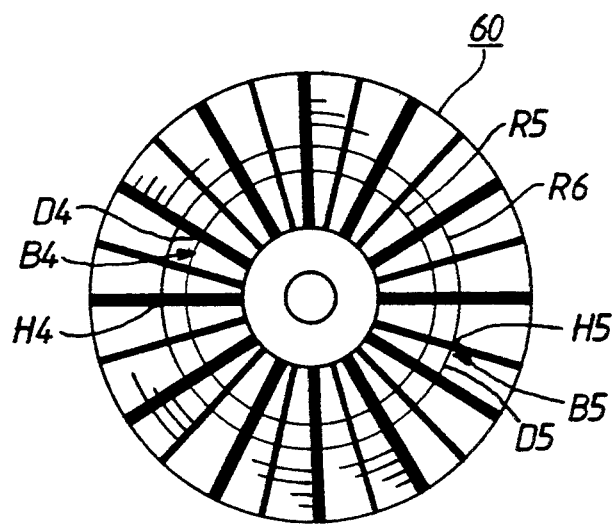
FIG. 9 illustrates another block pattern formed on the recording medium of FIGS. 1 and 2.

FIG. 9 illustrates a third embodiment of the present invention. An optical disk 60 has a first recording region R5 and a second recording region R6. First recording region R5 is defined by a first helical groove and second recording region R6 is defined by a second helical groove in a manner similar to optical disk 50 shown in FIG. 7(a). First and second recording regions R5 and R6 are respectively segmented into a plurality of blocks B4 and B5 which are formed from the inner to the outer periphery of optical disk 60. Each of first blocks B4 formed on first recording region R5 has a first data storage capacity of, for example, 2048 bytes. Each of second blocks B5 formed on second recording region R6 has a second data storage capacity different from the first data storage capacity. For example, the second storage capacity may be, for example, 1024 bytes. Data is preferably recorded on and read from first and second recording regions R5 and R6 using the CAV recording method. Thus, the lengths of first and second blocks B4 and B5 respectively increase with increasing radial position from the center of optical disk 60. As shown in Table 5, first recording region R5 has 6 blocks per track. Second recording region R6 has 12 blocks per track.

TABLE 5

| RECORDING REGION | BLOCKS PER TRACK | RECORDING METHOD |
| --- | --- | --- |
| First Recording Region (R5) | 6 | CAV |
| Second Recording Region (R6) | 12 | CAV |

As shown in FIG. 9, each first block B4 includes a block header H4 and a dam recording portion D4. Each second block B5 includes a block header H5 and a data recording portion D5. Block headers H4 and H5 are positioned in the header position of each block and include first, second, and third recording portions Bf, Bs, and Bt similar to the block header portions of block header H1 shown in FIG. 5.

In this embodiment, optical disk 60 includes first recording region R5 having first blocks B4 with a first data storage capacity and second recording region R6 having second blocks B5 with a second data storage capacity.

Thus, when optical disk 60 is used in optical disk device 100 as shown in FIG. 6, data can be recorded on and read from optical disk 60 more efficiently by optical disk device 100.

In accordance with a fourth embodiment of the present invention, an optical disk has a first recording region including a plurality of blocks having a first data storage capacity of, for example, 512 bytes and a second recording region including a plurality of blocks having second data storage capacity different than the first data storage capacity. The second data storage capacity may be, for example, 1024 bytes. With respect to the recording and reading method, data can be recorded on and read from first and second recording regions using the CLV recording method or M-CAV method.

In the embodiments described above, an optical disk with two substrates each having a recording layer is used for the recording medium. Alternatively, however, the information memory medium may be provided with a so called single-side recording type disk that has a recording layer on only one side of the disk or a disk whose substrate surfaces are bonded without an intervening spacer.

It should be understood that the detailed description and examples, which indicating presently preferred embodiments of this invention, are given by way of illustration only. Various modifications and changes may be made to the present invention, without departing from the scope or spirit of the invention, as set forth in the following claims.

We claim:

1. An information recording medium comprising:
   a first recording region comprising first tracks having a plurality of blocks, each block of said first tracks having a first data storage capacity and each of said first tracks having a same number of blocks; and
   a second recording region comprising second tracks having a plurality of blocks, each block of said second tracks having a second data storage capacity different than the first data storage capacity, one of said second tracks having a first number of blocks and another of said second tracks having a second number of blocks different than the first number of tracks.

2. The information recording medium according to claim 1, wherein said second recording region includes first and second recording portions each having at least one track, the tracks of said first recording portion having a number of blocks different than the number of blocks in each of said first tracks and the tracks of said second recording portion having a number of blocks different than the number of blocks of said first recording portion and different than the number of blocks in each of said first tracks.

3. The information recording medium according to claim 1, wherein each of said blocks includes a block header, wherein a spacing between adjacent block headers in said first recording region varies and the spacing between adjacent blocks in said second recording region is substantially constant.

4. The information recording medium according to claim 1, wherein said first recording region comprises a first helical groove extending from an inner to an outer portion of said information recording medium and said second recording region comprises a second helical groove offset from said first helical groove and extending from the inner to the outer portion of said information recording medium.

5. The information recording medium according to claim 1, wherein said information medium comprises an optical disk and said first recording region is defined by an inner radius Ra of said optical disk and a radius Rc and said second recording region is defined by the radius Rc and an outer radius Rb.

6. The information recording medium according to claim 5, wherein said first and second recording regions each have about a same number of tracks.

7. The information recording medium according to claim 6, wherein said second recording region comprises a plurality of recording portions, the tracks of each recording portion having a same number of blocks per track.

8. The information recording medium according to claim 1, wherein each block of said first tracks includes a first block header for recording identification data indicating the first recording and reading method and the first data storage capacity; and each block of said second tracks includes a second block header for recording identification data indicating the second recording and reading method and the second data storage capacity.

9. The information recording medium according to claim 1, wherein said first tracks of said first recording region and said second tracks of said second recording region are concentrically circular.

10. The information recording medium according to claim 1, wherein said first tracks of said first recording region and said second tracks of said second recording region are helical.

11. The information recording medium according to claim 1, wherein each of said first and second tracks corresponds to one turn of a single helical groove.

12. The information recording medium according to claim 1, wherein said first recording region is a recording region for storing data recorded using a constant angular velocity (CAV) method and said second recording region is a recording region for storing data recorded using one of a constant linear velocity (CLV) method and a modified constant angular velocity (M-CAV) method.

13. An information recording disk comprising:
a first recording region comprising helical first tracks formed to extend from an inner to an outer portion of said information recording disk, each of said first tracks corresponding to one turn on said information recording disk and having a same number of blocks each having a first data storage capacity; and
a second recording region comprising helical second tracks offset from said first tracks and formed to extend from said inner to said outer portion of said information recording disk, each of said second tracks corresponding to one turn on said information recording disk and having a plurality of blocks each having a second data storage capacity different than the first data storage capacity, said second tracks having a first area having a first number of blocks, and said second tracks having a second area having a second number of blocks different than the first number of blocks.

14. The information recording disk according to claim 13, wherein said first recording region is a recording region for storing data recorded using a constant angular velocity (CAV) method and said second recording region is a recording region for storing data recorded using one of a constant linear velocity (CLV) method and a modified constant angular velocity (M-CAV) method.

15. The information recording disk according to claim 13, wherein each of said blocks includes a block header, spacing between adjacent block headers in said first recording region varies, and spacing between adjacent block headers in said second recording region is substantially constant.

16. The information recording disk according to claim 15, wherein each block header in said first recording region is formed from pits having a first depth, each block header in said second recording region is formed from pits having a second depth different from said first depth.

* * * * *